(12) United States Patent
Fraisse et al.

(10) Patent No.: US 6,984,000 B2
(45) Date of Patent: Jan. 10, 2006

(54) COMPACT TANK FOR AN ELECTROHYDRAULIC BRAKING SYSTEM

(75) Inventors: Emmanuel Fraisse, Paris (FR); François Gaffe, Rosny sous Bois (FR); Philippe Come, Senlis (FR); Jean-Pierre Delage, Saint Mande (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/493,559

(22) PCT Filed: Oct. 23, 2002

(86) PCT No.: PCT/FR02/03635

§ 371 (c)(1),
(2), (4) Date: Apr. 23, 2004

(87) PCT Pub. No.: WO03/039931

PCT Pub. Date: May 15, 2003

(65) Prior Publication Data
US 2004/0245848 A1 Dec. 9, 2004

(30) Foreign Application Priority Data
Oct. 25, 2001 (FR) .................................. 01 14078

(51) Int. Cl.
*B60T 17/00* (2006.01)
*B60T 11/26* (2006.01)

(52) U.S. Cl. ...................... 303/1; 303/113.1; 188/345; 60/585

(58) Field of Classification Search ............. 303/113.1, 303/1; 188/1.11 R, 345, 1.11 E; 340/450.1, 340/624; 137/558; 73/305, 307; 60/534, 60/592, 585, 535; 225/501, 555; 116/228
See application file for complete search history.

(56) References Cited

U.S. PATENT DOCUMENTS

| | | | | |
|---|---|---|---|---|
| 4,355,512 A | * | 10/1982 | Kubota et al. ................. | 60/534 |
| 4,385,495 A | * | 5/1983 | Kubota ......................... | 60/535 |
| 4,514,980 A | * | 5/1985 | Ishiwata ....................... | 60/534 |
| 4,775,856 A | * | 10/1988 | Ochs et al. ................... | 340/624 |
| 4,805,668 A | * | 2/1989 | Genter et al. ................. | 60/535 |
| 4,900,105 A | * | 2/1990 | Burgdorf et al. .......... | 303/116.1 |
| 5,941,608 A | * | 8/1999 | Campau et al. .......... | 303/113.4 |
| 5,957,545 A | * | 9/1999 | Sawada et al. ................ | 303/1 |
| 6,105,611 A | * | 8/2000 | Ando et al. .................. | 137/558 |
| 2004/0245848 A1 | * | 12/2004 | Fraisse et al. ................. | 303/1 |

FOREIGN PATENT DOCUMENTS

| DE | 3724896 | * | 2/1989 |
|---|---|---|---|
| DE | 4029931 | * | 3/1992 |
| DE | 4312063 | * | 6/1994 |

* cited by examiner

*Primary Examiner*—Thomas Williams
(74) *Attorney, Agent, or Firm*—Leo H McCormick, Jr.; Warren Comstock

(57) ABSTRACT

A tank intended for an electrohydraulic braking system comprises, according to the present invention, a first chamber (7) for the supply of a primary hydraulic circuit of a master cylinder with brake fluid, a second chamber (9) for the supply of a secondary hydraulic circuit of the master cylinder (not shown) with brake fluid, a third chamber (11) for the supply of a hydraulic pump with brake fluid, and a fourth chamber (13), a measuring one, which accommodates a detection device, indicating when the brake-fluid level inside the tank is too low. The tank has a flow path for the interconnection of the first chamber (7), the second chamber (9) and the third chamber (11) when the hydraulic-fluid level is higher than a safety level, and for the fluid-tight separation of said chambers when the hydraulic-fluid level is lower than the safety level.

6 Claims, 4 Drawing Sheets

COMPACT TANK FOR AN ELECTROHYDRAULIC BRAKING SYSTEM

The present invention mainly relates to a compact tank for the supply of a hydraulic braking system with brake fluid and it relates, more particularly, to a tank ensuring the brake-fluid supply of an electrohydraulic braking circuit, both in a normal operating situation and in a deteriorated operating state.

In a well-known manner, an electrohydraulic braking system comprises a braking circuit, which delivers pressure brake-fluid to the brakes mounted at the wheels of the vehicle, while said circuit is supplied with brake fluid, in a normal operating situation, by a hydraulic pump controlled by a computer and, in a deteriorated operating state, by a hydraulic master cylinder. The computer receives, from various sensors, for instance travel sensors disposed at a brake pedal, information on the driver's will to slow down the vehicle, to bring it to a standstill or to keep up a constant speed. The brake pedal is connected with a longitudinal end of an actuating rod, the second longitudinal end of which is connected with a hydraulic piston of the master cylinder, which comprises means for the simulation of the braking feeling at the brake pedal, reproducing the hydraulic-reaction of a conventional braking circuit, in a normal operating situation.

Under exceptional circumstances, the computer or the hydraulic pump may happen to be unavailable and consequently the master cylinder is used as the direct source of pressure brake fluid for the brakes.

On safety grounds, the hydraulic pump is supplied with brake fluid by a first tank whereas the master cylinder is supplied with brake fluid by a second tank. Thus, in case of a leakage, e.g. from the first tank, the brake-fluid volume contained inside the second tank does not change, and the braking operation can be carried out in a quite reliable manner. Besides, the legislation in force lays down that a detection device must be provided in each tank so as to detect too low a brake-fluid level for a reliable operation of the braking-system circuit and, if such level actually is too low, to warn the driver, e.g. through the lighting of a light indicator on the dashboard.

Yet such an implementation results in the problem of the room occupied, since the available space in the engine compartment is more and more reduced, and it also implies a greater cost and a more complicated fitting process, because of the cost prices of the devices for the detection of the brake-fluid level, and of the electrical wiring connecting said devices to the alarm device.

Therefore, it is an object of the present invention to provide reliable compact means for the supply of an electrohydraulic braking circuit with brake fluid.

Another object of this invention consists in providing reliable means for the supply of an electrohydraulic braking circuit with brake fluid, at a low cost price.

It is also an object of the present invention to provide reliable means for the supply of an electrohydraulic braking circuit with brake fluid, requiring but a simplified fitting process.

These objects are achieved, in accordance with this invention, by a tank for an electrohydraulic braking system, supplying both a master cylinder and a hydraulic pump, and comprising at least one brake-fluid level sensor, said tank meeting the same safety requirements as two independent tanks, fitted each with a level sensor.

In other words, the tank according to the present invention comprises at least a first chamber, a second chamber and a third chamber, said first and second chambers supplying the master cylinder whereas the third chamber supplies the hydraulic pump. The tank further comprises means for the interconnection of the first, second and third chambers when the brake-fluid level inside the tank is higher than a predetermined level, and means for a fluid-tight separation of said chambers when the brake-fluid level within one of said chambers is lower than said predetermined level, wherein the tank also comprises at least one brake-fluid level sensor for the detection of a lowering of the brake-fluid level in one of the chambers.

The main subject of the present invention is a brake-fluid tank for a braking system, comprising a casing, defining an inner space, a filling port, at least one outlet port, a first supply chamber for a primary hydraulic circuit, a second supply chamber for a secondary hydraulic circuit, a level sensor for the hydraulic fluid contained in said tank, when such level is lower than a minimum level, characterised in that said tank also comprises a third supply chamber for a hydraulic pump, and means for the interconnection of the first, second and third chambers when the hydraulic-fluid level is higher than a safety level, and for the fluid-tight separation of said chambers when the hydraulic-fluid level is lower than the safety level, which is lower than or equal to the minimum level.

Another subject matter of the present invention is a tank, characterised in that it comprises a fourth chamber, namely a measuring chamber, accommodating the hydraulic-fluid level sensor.

Another subject matter still of the present invention is a tank, characterised in that the fourth chamber is situated substantially centrally in said tank.

According to another aspect of the invention, a tank is characterised in that the fourth chamber is separated from the first, second and third chambers by a partition wall provided with passages for a communication of said chambers with the fourth chamber.

The present invention also deals with a tank, characterised in that the passages are situated between the safety level and the minimum level.

Another subject matter still of the present invention is a tank, characterised in that the fourth chamber is surrounded with an annular passage communicating with the chambers.

According to another aspect of the invention, a hydraulic tank is characterised in that the means, intended for the interconnection of the first, second and third chambers when the hydraulic-fluid level is higher than a safety level, and for the fluid-tight separation of said chambers when the hydraulic-fluid level is lower than the safety level, consist of dividing walls extending, in a fluid-tight manner, from the bottom wall of the tank towards the top wall of the tank, to a height which is smaller than the distance between the bottom wall of the tank and the top wall of the tank, such dividing walls being provided between the first, second and third chambers and forming, between their upper ends and the top wall of the tank, interconnecting ports for said first, second and third chambers.

Another subject matter still of the present invention is a tank, characterised in that the dividing walls extend between the first, second and third chambers and the annular passage.

The present invention also deals with a hydraulic tank, characterised in that the third chamber comprises a brake-fluid reinjection port, which is provided in the top wall of the tank and intended to be connected with a brake-fluid return line from a braking circuit.

According to another aspect, this invention provides an electrohydraulic braking system comprising a braking member, such as a brake pedal, detection means, a computer outputting a command for the hydraulic pump to deliver brake-fluid to at least one brake mounted at a wheel of the vehicle, on the detection, by the detection means, of the driver's action on the braking member, and a master cylinder connected to the brake, characterised in that it also comprises a tank according to any one of the preceding aspects.

Other features and advantages of the present invention will be apparent from the following detailed description, when taken in conjunction with the accompanying drawings, in which FIG. 1 is a top view of a preferred embodiment of a tank according to this invention;

Figure 1:
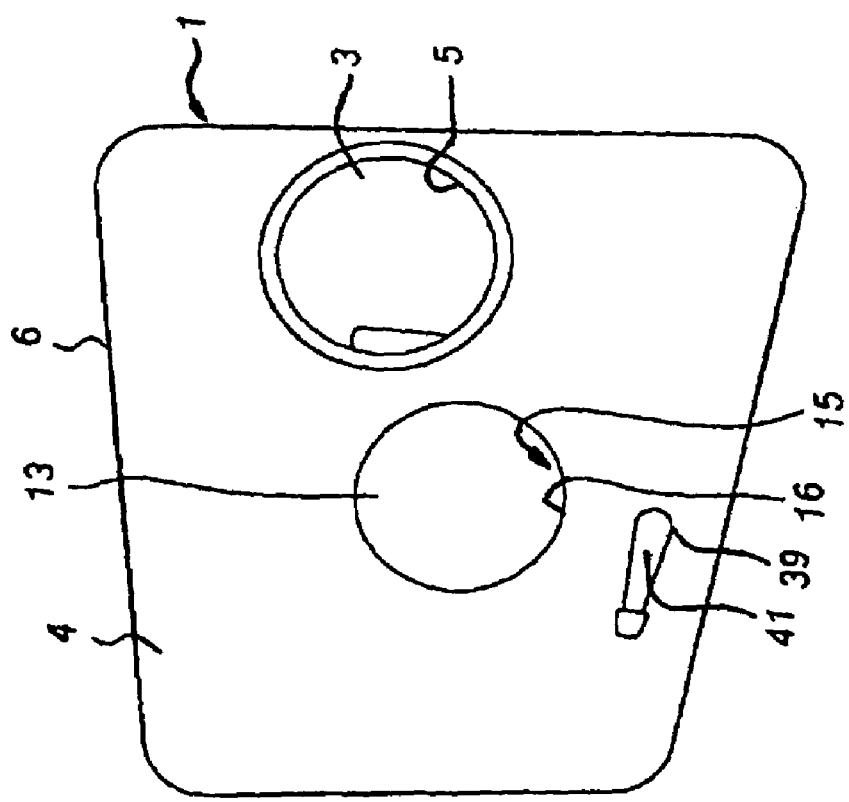
Figure 2:
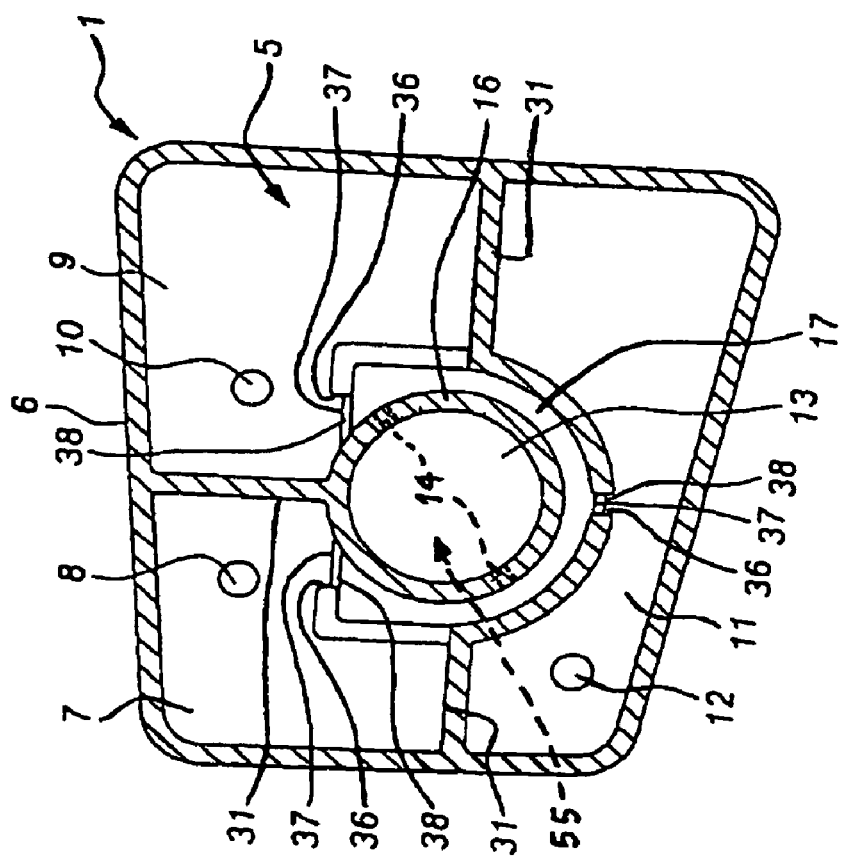
FIG. 2 is a sectional view in the plane of FIG. 1.

FIGS. 1 and 2 show the preferred embodiment of a tank R according to the present invention. The tank comprises a casing 1 defining an inner space 3 communicating with the outside through a filling port 5, provided in a top wall 4 of the casing 1. The filling port 5 is capable of being closed, in a fluid-tight manner, by a sealing means, for instance a plug or a cap.

Figure 4:
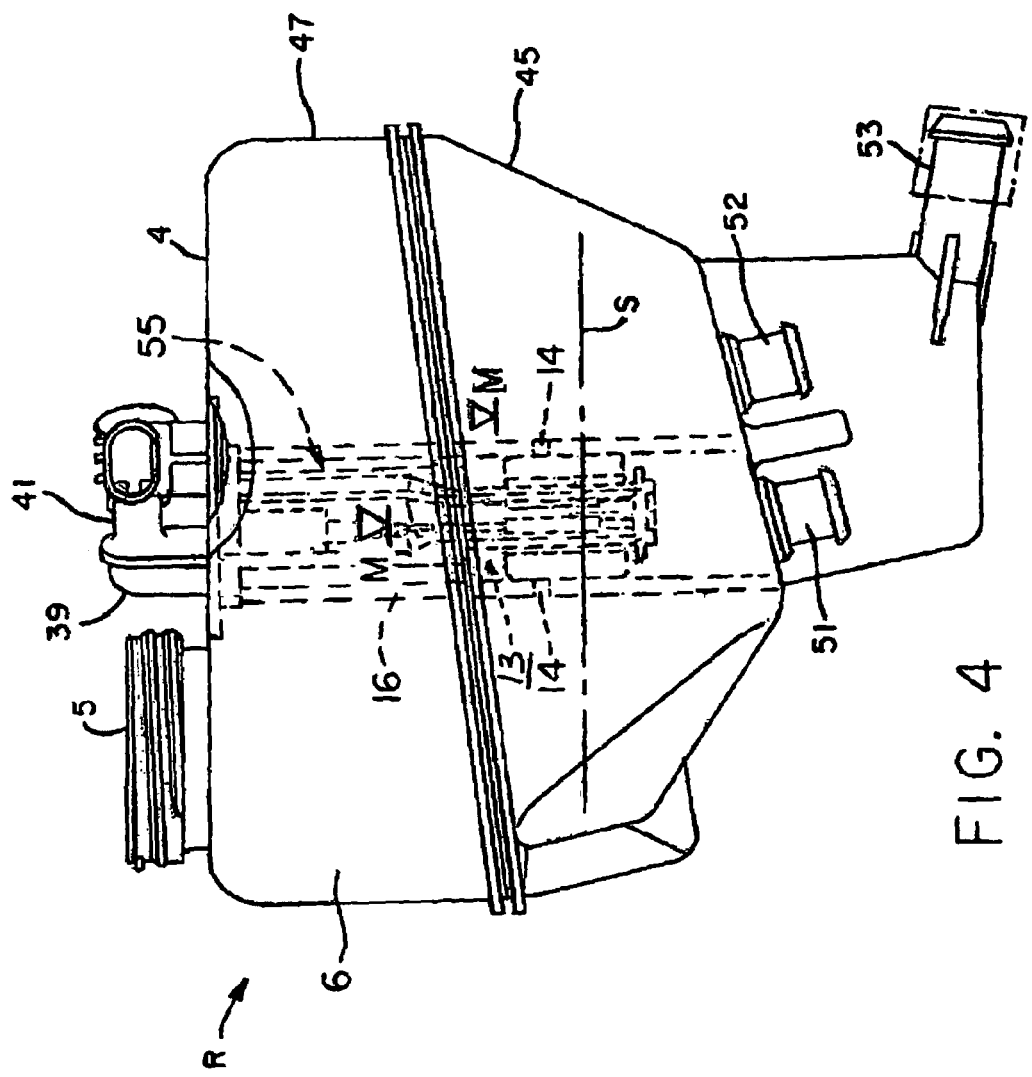

The tank R also comprises marks for the minimum level m and the maximum level M of the brake fluid contained inside the tank, as specified by the manufacturer of the braking system for an efficient operation of the braking circuit, see FIG. 4. Most advantageously, such marks m and M are located on a side wall 6 of the tank R, extending between the top wall 4 of the tank R and the bottom wall 8 of the tank R, in a fluid-tight manner. The driver can readily see these marks for the visual checking of the brake-fluid level. In an advantageous manner, the tank R consists of two parts, namely a lower part 45 and an upper part 47 most advantageously welded so as to form a leakproof tank R and, quite advantageously too, the tank R is made of a transparent plastic, preferably using a molding process, for an easy visual checking of the brake-fluid level inside the tank R.

The inner space 3 is divided into at least three chambers and, more advantageously, four chambers. A first chamber 7 supplies a primary hydraulic circuit of a master cylinder 19 with brake fluid through port 51, a second chamber 9 supplies a secondary hydraulic circuit of the master cylinder 19 with brake fluid through port 52, a third chamber 11 supplies a hydraulic pump 23 with brake fluid through port 53, whereas a fourth chamber 13 is a measuring chamber, accommodating a detection device 55, intended for the detection of the brake-fluid level inside the tank R, such device indicating when the brake-fluid level in the tank R is lower than the minimum level m.

The chambers 7, 9 and 11 deliver fluid to the primary hydraulic circuit, the secondary hydraulic circuit and the braking circuit, respectively, through connecting means (ports 51,52,53) which are provided in the bottom wall of the tank R and, more particularly, in the bottom walls of each one of the chambers 7, 9 and 11.

In an advantageous manner, the chamber 11, which supplies the braking circuit with fluid in a normal operating situation, has a greater capacity than the chambers 7, 9 and 13, owing to the fact that the hydraulic pump, which draws brake fluid from such chamber 11, requires a greater brake-fluid working volume.

The chamber 13 is defined by a sleeve 16, extending from the top wall of the tank R to the bottom wall of the tank R and communicating with the outside through a port 15, provided in the top wall of the tank R.

The measuring chamber 13 is connected with the supply chambers 7, 9 and 11 through passages 14, advantageously small-diameter ones, provided in the wall of the sleeve 16 between the chambers 7, 9 and 11 and the measuring chamber 13. These passages 14 are situated at a height below the minimum level m and, advantageously, above a safety level s, with the result that such passages 14 are capable of separating, in a fluid-tight manner, the chambers 7, 9 and 11 from the measuring chamber 13 in case of a leakage as regards the measuring chamber 13, so as to ensure a safety brake-fluid volume for the reliable operation of the braking circuit.

Quite advantageously, the fourth chamber 13 has a smaller capacity than the capacities of the first, second and third chambers 7, 9 and 11, and it is capable of limiting the level variations of the brake-fluid volume in contact with the level sensor 55 when the vehicle, fitted with such tank R, is running and therefore, of avoiding an inopportune triggering of the level sensor. As a matter of fact, the measuring volume is contained within the measuring chamber 13 and a brake-fluid flow from the chambers 7, 9 and 11 into the measuring chamber 13 is slowed down by the small-diameter passages 14. Consequently, for instance on strong accelerations or decelerations, the moving brake is fluid inside the chambers 7, 9 and 11 exercises very little influence, if any at all, on the brake-fluid level inside the measuring chamber.

In the preferred embodiment of the tank R according to the present invention, in an advantageous manner, the measuring chamber 13 is situated substantially centrally in the tank R and, quite advantageously too, it is surrounded with an annular passage 17 into which the passages 14 open, both for an interconnection of the chambers 7, 9 and 11, and for a connection of the chambers 7, 9, 11 with the chamber 13.

Advantageously, the chambers 7, 9 and 11 are separated from each other by partition walls 31, extending from the bottom wall 8 of the tank R up to the top wall 4 of the tank R, so as to rigidify the tank R. Since such partition walls 31 separate, in an advantageous fluid-tight manner, the chambers 7, 9 and 11 from each other, the latter may be interconnected only through the annular passage 17.

Preferably, the intercommunication of the chambers 7, 9 and 11 and the supply chamber 13 is restricted by means of dividing walls 37, extending from the bottom wall 8 of the tank R to a height, which is smaller than the distance between the top wall 4 of the tank R and the bottom wall 8 of the tank R, thus forming, between their upper ends 38 and the top wall 4 of the tank R, interconnecting ports 36 for the first, second and third chambers, 7, 9 and 11 respectively, and the annular passage 17. The height of the dividing walls 37 corresponds to the safety level s of the brake fluid for the operation of the braking circuit. Such level s is lower than or equal to the minimum filling level m, as marked on the side wall of the tank R, and below which the detection device 55 warns the driver of this anomaly, i.e. a shortage of brake fluid. Thus, in the case of a leakage from one of the chambers 7, 9 or 11, a minimum brake-fluid volume is ensured by the chambers 7, 9 and 11, which are not leaking.

The supply chamber 11 comprises, at its upper part, a brake-fluid reinjection or return port 39, for the brake fluid returned from the braking circuit at the end of a braking action. In an advantageous manner, the port 39 extends to the outside into an elbow pipe 41, intended to be connected, in a leakproof manner, with a brake-fluid return line, being part of the braking circuit, while it extends, to the inside, into a gravity-flow pipe (not represented).

Figure 3:
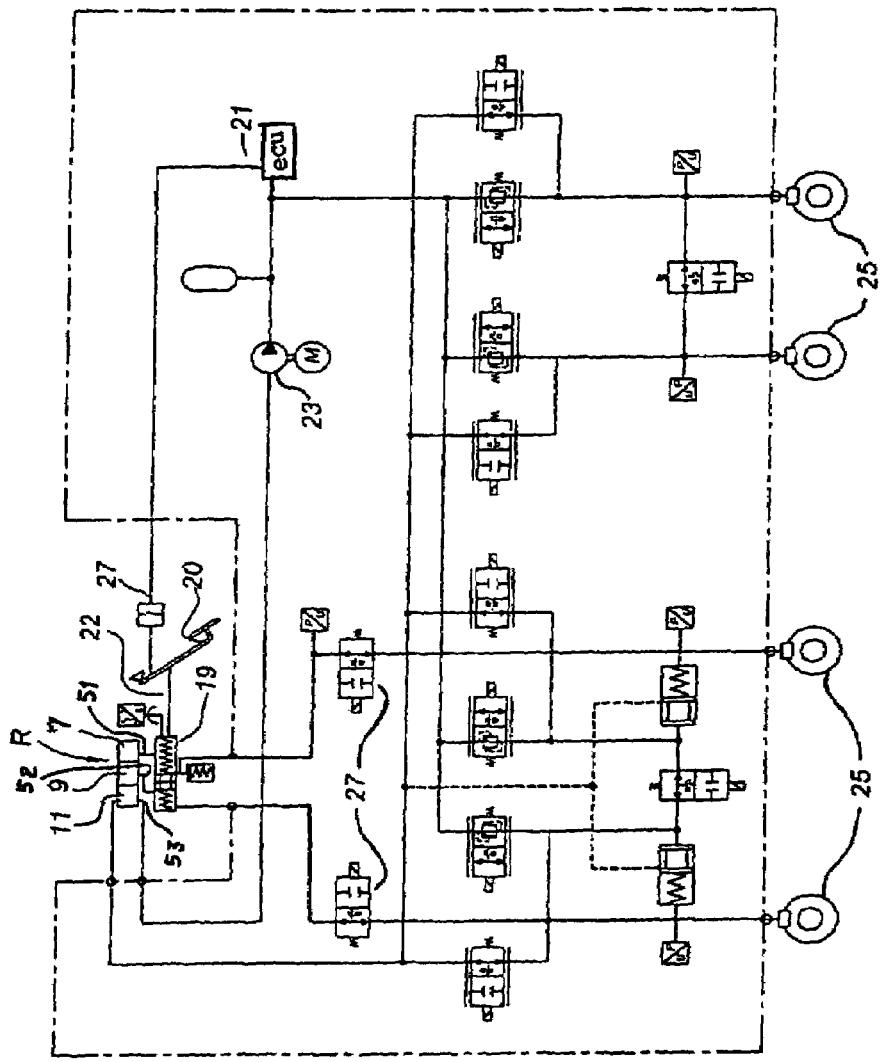
FIG. 3 is a diagram of an electrohydraulic braking system comprising a tank according to this inventions and FIG. 4 is a side elevation of the tank of FIG. 1.

FIG. 3 shows an electrohydraulic braking system comprising a tank R according to this invention, and also comprising a master cylinder 19, actuated by an actuating rod 22 connected with a brake pedal 20, to be depressed by the driver, detection means 27 for the travel of the brake pedal and/or that of the actuating rod, e.g. travel sensors, ecu or computer 21 outputting a command on the basis of information received from the detection means 55, such command being applied to a hydraulic pump 23, which sucks in brake fluid out of the chamber 11 and delivers pressure brake fluid to brakes 25 mounted at the wheels. The computer 21 also controls solenoid valves 27 which, in a normal operating state, disconnect the master cylinder 19 from the brakes 25. At rest, that is when the computer 21 does not issue any commands for the applying of the brakes, the solenoid valves 27 are open and, therefore, in case of need, for instance some dysfunctioning of the computer 21 or of the pump 23, the master cylinder 19 is connected to the brakes and when the driver depresses the brake pedal, thus controlling the master cylinder through the connecting rod, the master cylinder takes charge of the delivery of pressure brake fluid to the brakes so as to decelerate the vehicle.

Now, the following description will explain how the safety is provided, in case of a leakage from one of the chambers of the tank R according to the present invention.

In a normal operating situation, the pump 23 draws brake fluid from the chamber 11 and delivers it to the brakes so as to apply them. In a degradated operating state, for instance when the pump does not work any longer either on account of a malfunction of the pump itself or because of a malfunction of the computer, the brakes are actuated by the master cylinder, in that the brake fluid is delivered from the chambers 7 and 9. The brake-fluid level detecting device 55, consisting, e.g., of an electric circuit, which is closed by a conductive float when the brake-fluid level is sufficient, is arranged in the measuring chamber 13 and connected to a processing unit, for instance the computer 21, and it makes it possible to indicate a leak in the tank, by the breaking of the electric circuit owing to the fact that the conductive float moves away, since it is compelled to lie at the surface of the brake-fluid, contained in the measuring chamber 13.

In a normal operating situation, the chambers 7, 9, 11 and 13 as well as the annular passage 17 have the same filling level. If any one of the chambers 7, 9, 11, 13 or the annular passage 17 happens to leak, the brake-fluid volumes contained inside each one of the chambers 7, 9, 11 and 13 are reducing and accordingly the fluid levels in the chambers 7, 9, 11 and 13 are going down simultaneously till they reach the safety level s.

When the safety level s is reached, which corresponds to the upper ends of the dividing walls 37, the chambers 7, 9, 11 and 13 are isolated in a fluid-tight manner through the dividing walls 37, with the result that the undamaged chambers still contain enough brake fluid for the braking circuit to operate reliably or at least to ensure an adequate braking force so as to bring the vehicle to a standstill. Since the safety level s is lower than or equal to the minimum brake-fluid level m, at which the sensor detects a shortage of brake fluid, in such a case the sensor or detector 55 warns the driver of the leakage, for instance by the lighting of a light indicator or the emission of a visual or a sound signal in the passenger space, indicating that the brake-fluid volume inside the tank R is no longer enough to ensure an optimum operation of the brakes.

Therefore, this invention does provide a compact tank for the supply of a braking circuit, intended for an electrohydraulic braking system, since it makes it possible both to detect, in an easy and efficient manner, too low a brake-fluid volume inside the tank, and to ensure a safety brake-fluid volume for a reliable operation of the braking system. Furthermore, such tank does not require much room, its cost price is low because it comprises only one detection device 55 for the brake-fluid level, thus reducing both the cost and the complexity of the fitting process of said tank in the engine compartment, and also because it is made using a two-step moulding process.

The present invention concerns, more particularly, the motor car industry.

And the present invention mainly applies to the design and manufacturing of braking systems for motor vehicles and, more especially, of braking systems for private cars.

What is claimed is:

1. A brake-fluid tank for a braking system, comprising a casing, defining an inner space (3), a filling port, at least one outlet port, a first supply chamber (7) for a primary hydraulic circuit, a second supply chamber (9) for a secondary hydraulic circuit, a level sensor for the hydraulic fluid contained in said tank (R), when such level is lower than a minimum level (m), characterised in that said tank also comprises a third supply chamber (11) for a hydraulic pump (23), and means for the interconnection of the first, second and third chambers when the hydraulic-fluid level is higher than a safety level (s), and for the fluid-tight separation of said chambers when the hydraulic-fluid level is lower than the safety level (s), the safety level (s) being lower than or equal to the minimum level (m) and a fourth chamber (13) for accommodating the level sensor, said fourth chamber (13) being situated substantially centrally in said tank (R) and separated from the first, second and third chambers (7, 9, 11) by a partition wall (15) that is provided with passages (14) connecting the first, second and third chambers (7, 9, 11) with said fourth chamber (13), said passages (14) being situated between the safety level (s) and the minimum level (m).

2. The tank according to claim 1, characterised in that the fourth chamber (13) is surrounded with an annular passage (17) communicating with the chambers (7, 9, 11).

3. The tank according to claim 2, characterised in that the means (37, 36), intended for the interconnection of the first, second and third chambers when the hydraulic-fluid level is higher than the safety level (s), and for the fluid-tight separation of said chambers when the hydraulic-fluid level is tower than the safety level (s), comprises dividing walls (37) extending, in a fluid-tight manner, from the bottom wall (8) towards the top wall (4) of the tank (R), to a height which is smaller than the distance between the bottom wall (8) of the tank (R) and the top wall (4) of the tank (R), said dividing walls being provided between the first, second and third chambers (7, 9, 11) and forming, between their upper ends (38) and the top wall of the tank, interconnecting ports (36) for said first, second and third chambers (7, 9, 11).

4. The tank according to claim 3, characterised in that the dividing walls (37) extend between the first, second and third chambers (7, 9, 11) and the annular passage (17).

5. The tank according to claim 4, characterised in that the third chamber (11) comprises a brake-fluid reinjection port, which is provided in the top wall (4) of the tank (R) and intended to be connected with a brake-fluid return line from a braking circuit.

6. The tank according to claim 5 for use in an electrohydraulic braking system comprising a braking member, a brake pedal, detection means, a computer (21) outputting a command for the hydraulic pump (23) to deliver brake-fluid to at least one brake (25) mounted at a wheel of the vehicle, on the detection, by the detection means, of the driver's action on the braking member, and a master cylinder connected to the brake (25).

* * * * *